(12) United States Patent
Boday et al.

(10) Patent No.: US 9,422,386 B2
(45) Date of Patent: Aug. 23, 2016

(54) FLAME RETARDANT ACRYLIC/PLA COPOLYMER

(71) Applicant: International Business Machines Corporation, Armonk, NY (US)

(72) Inventors: Dylan J. Boday, Tucson, AZ (US); Joseph Kuczynski, North Port, FL (US); Timothy C. Mauldin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 14/513,349

(22) Filed: Oct. 14, 2014

(65) Prior Publication Data

US 2016/0102163 A1   Apr. 14, 2016

(51) Int. Cl.
  *C08F 293/00* (2006.01)
  *C08F 291/08* (2006.01)
  *C08F 291/06* (2006.01)

(52) U.S. Cl.
  CPC .......... *C08F 293/005* (2013.01); *C08F 291/06* (2013.01); *C08F 291/08* (2013.01)

(58) Field of Classification Search
  None
  See application file for complete search history.

(56) References Cited

U.S. PATENT DOCUMENTS

| | | | |
|---|---|---|---|
| 4,065,428 | A | 12/1977 | Deets |
| 5,137,953 | A | 8/1992 | Fuhr et al. |
| 6,339,166 | B1 | 1/2002 | Allcock et al. |
| 7,709,569 | B2 | 5/2010 | Rafailovich et al. |
| 2006/0264573 | A1 | 11/2006 | Bennett et al. |
| 2006/0270779 | A1 | 11/2006 | Mochizuki et al. |
| 2013/0035429 | A1 | 2/2013 | Tajima |

FOREIGN PATENT DOCUMENTS

| | | | |
|---|---|---|---|
| CN | 101225224 A | | 7/2008 |
| EP | 0765889 A1 | | 4/1997 |
| EP | 0964027 B1 | | 5/2004 |
| EP | 2013288 B1 | | 2/2013 |
| KR | 10-2011-0113947 | * | 5/2013 |
| WO | 03027175 A1 | | 4/2003 |
| WO | 2012015128 A1 | | 2/2012 |
| WO | 2012169761 A2 | | 12/2012 |

OTHER PUBLICATIONS

Lee et al., electronic translation of KR 10-2011-0113947, May 2013.*
Price et al., "Flame retardance of poly(methyl methacrylate) modified with phosphorus-containing compounds", Polymer Degradation and Stability, vol. 77, 2002, pp. 227-233.
"Altuglas International and NatureWorks Launch Worldwide Marketing Collaboration for New High Performance Alloys Incorporating Ingeo(TM) Biopolymers", printed from <http://globenewswire.com/news-release/2012/12/11/510816/10015271/en/Altuglas-International-and-NatureWorks-Launch-Worldwide-Marketing-Collaboration-for-New-High-Performance-Alloys-Incorporating-Ingeo-TM-Biopolymers.html> on Jul. 23, 2014, 3 pages.

* cited by examiner

*Primary Examiner* — Jeffrey Mullis
(74) *Attorney, Agent, or Firm* — Matthew J. Bussan

(57) ABSTRACT

A flame retardant acrylic/polylactic acid (PLA) copolymer is synthesized which contains a FR-PMMA block that includes either a poly(MMAP) block or a poly(MMA-co-MMAP) block, wherein MMA is methyl methacrylate and MMAP is a MMA-like monomer that is functionalized with a phosphorus-containing moiety. In some embodiments, the flame retardant acrylic/PLA copolymer is a diblock copolymer containing a PLA block and a FR-PMMA block. In other embodiments, the flame retardant acrylic/PLA copolymer is a triblock-graft copolymer containing a PLA block, a PMMA block and a FR-PMMA block.

20 Claims, 3 Drawing Sheets

FLAME RETARDANT ACRYLIC/PLA COPOLYMER

BACKGROUND

The present invention relates in general to the field of polymers. More particularly, the present invention relates to flame retardant acrylic/PLA diblock and triblock-graft copolymers.

SUMMARY

In accordance with some embodiments of the present invention, a flame retardant acrylic/polylactic acid (PLA) copolymer is synthesized which contains a FR-PMMA block that includes either a poly(MMAP) block or a poly(MMA-co-MMAP) block, wherein MMA is methyl methacrylate and MMAP is a MMA-like monomer that is functionalized with a phosphorus-containing moiety. In some embodiments, the flame retardant acrylic/PLA copolymer is a diblock copolymer containing a PLA block and a FR-PMMA block. In other embodiments, the flame retardant acrylic/PLA copolymer is a triblock-graft copolymer containing a PLA block, a PMMA block and a FR-PMMA block.

BRIEF DESCRIPTION OF THE SEVERAL VIEWS OF THE DRAWINGS

Embodiments of the present invention will hereinafter be described in conjunction with the appended drawings, where like designations denote like elements.

DETAILED DESCRIPTION

Figure 1:
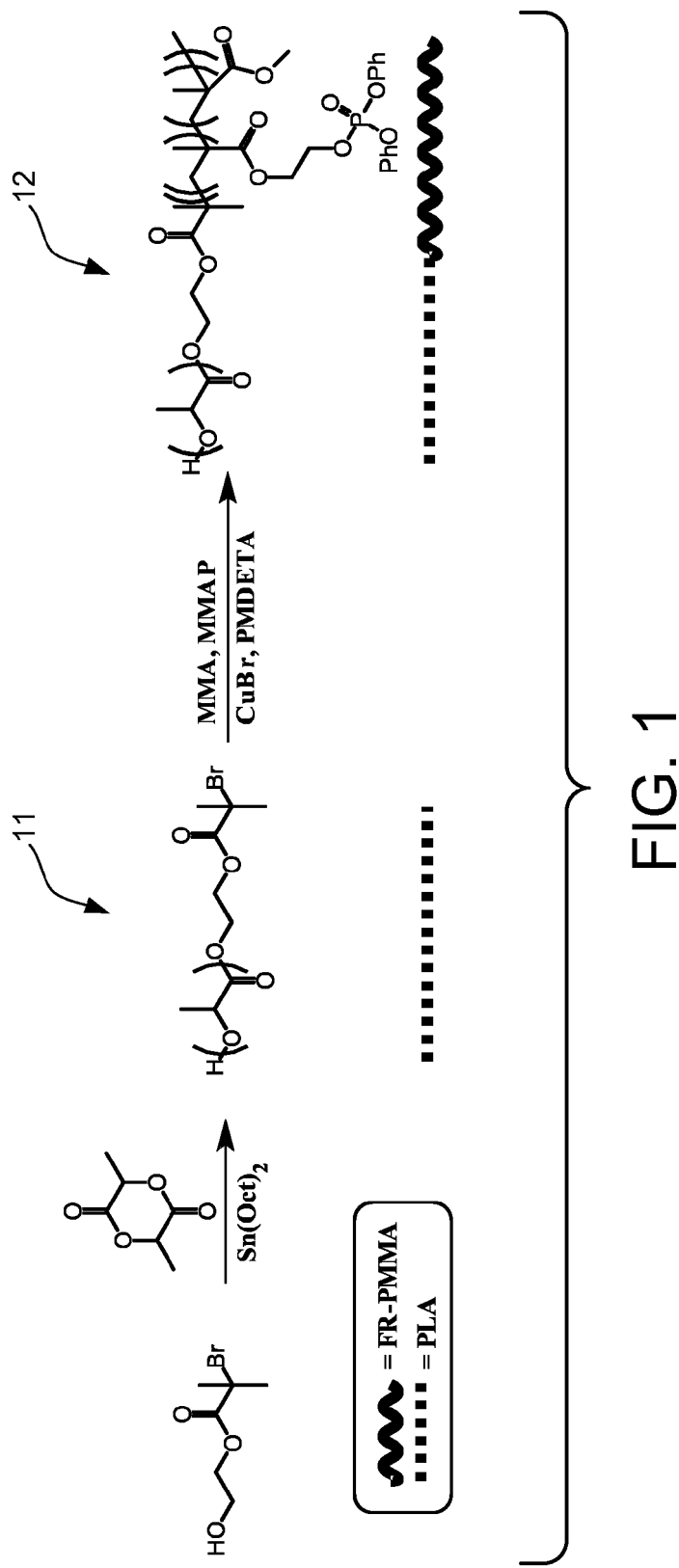
FIG. 1 illustrates a synthetic procedure that may be used to produce a flame retardant acrylic/PLA diblock copolymer containing a PLA block and a poly(MMA-co-MMAP) block in accordance with some embodiments of the present invention.

There is considerable interest in the use of renewably-sourced polymers in numerous applications, including electronic applications. Many applications require that components within systems be flame retardant in order to be used. These components must pass certifications such as those promulgated by UL (Underwriters Laboratories) or CSA (Canadian Standards Association). As renewably-sourced polymers find more and more use in such systems, flame retardancy issues become a major challenge to overcome. When used in electronic applications, for example, one of the major hurdles for any material to overcome is the requirement to obtain the V-0 classification specified in UL 94 at thin (e.g., 1.6 mm) wall thickness. UL 94 (i.e., "Standard for Tests for Flammability of Plastic Materials for Parts in Devices and Appliances") describes a test program that determines the material's tendency either to extinguish or to spread the flame once the specimen has been ignited.

Polylactic acid (PLA) is a commercially available, renewably-sourced polymer that has been successfully blended with various polymers resulting in blends with a sizable fraction of biobased material. Such materials are exemplified by the PLA/poly(methyl methacrylate) (PMMA) blends marketed under the tradename Altuglas Rnew from Altuglas International, a subsidiary of Arkema Group, Colombes, France. These blends offer excellent moldability and optical transparency and can replace traditional PMMA or polycarbonate (PC) grades for use as light pipes, for example, in electronic enclosures. Unfortunately, none of these blends are flame retardant. Consequently, a need exists for an optically transparent, flame retardant renewably-sourced polymer.

In accordance with some embodiments of the present invention, strategic copolymerization of commodity monomers yields flame retardant PMMA (this flame retardant PMMA is also referred to herein as "FR-PMMA") that is inherently compatible (i.e., capable of forming homogeneous, transparent blends) with PLA. Flame retardancy is incorporated directly into the PMMA backbone by copolymerization of the monomer methyl methacrylate (MMA) with a MMA-like monomer that is functionalized with a phosphorus-containing small molecule (this functionalized MMA-like monomer is also referred to herein as a "flame retardant MMA monomer" and "MMAP"). The resulting FR-PMMA is then either directly blended with PLA, or blended with a PMMA/PLA blend.

For example, a phosphorus-functionalized monomer structurally similar to MMA is synthesized from hydroxyethyl methacrylate (HEMA) and a phosphorus-containing monomer such as, but not limited to, diphenyl phosphoryl chloride to form a flame retardant MMA monomer (i.e., MMAP) in accordance with Reaction Scheme 1, below.

Reaction Scheme 1

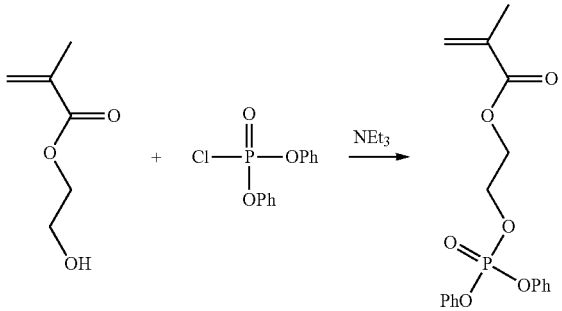

where Ph is a phenyl group. In Reaction Scheme 1, the exemplary flame retardant MMA monomer is synthesized by reacting HEMA and diphenyl phosphoryl chloride in the presence of a catalyst such as triethylamine (NEt$_3$) (also referred to as "Et$_3$N", "TEA" and "N,N-diethylethanamine"). In this reaction, the hydroxyl groups present in the HEMA serve as synthetic handles. These hydroxyl groups react with the chlorine atom present in the diphenyl phosphoryl chloride via a condensation reaction. The reaction is typically performed at approximately 0-30° C. The flame retardant MMA monomer reaction product may be purified using techniques well known in the art.

PROPHETIC EXAMPLE 1

Synthesis of the Flame Retardant MMA Monomer (MMAP) of Reaction Scheme 1

To a 100 mL round bottom flask cooled in an ice bath, hydroxyethyl methacrylate (HEMA) (4.5 mL, 4.8 g, 37.2 mmol), 30 ml dichloromethane, and a stir bar were added. A solution of diphenyl phosphoryl chloride (7.7 mL, 10 g, 37.2 mmol) and triethylamine (NEt₃) (5.7 mL, 4.1 g, 40.9 mmol) in 10 ml dichloromethane was added dropwise, and the reaction was stirred for 2 h. The reaction was then washed with 1 M HCl (3×25 mL) and brine (1×25 mL). The solvent was dried with an appropriate drying agent (e.g., anhydrous MgSO₄) and solvent was evaporated under reduced pressure to reveal pure product. *End of Prophetic Example 1*

In Reaction Scheme 1, diphenyl phosphoryl chloride is an exemplary phosphorous-containing monomer. One skilled in the art will appreciate that other phosphorus-containing monomers capable of reacting with the hydroxyl group in HEMA via a condensation reaction may be used in lieu of, or in addition to, diphenyl phosphoryl chloride. Phosphorus-containing monomers suitable for reacting with the hydroxyl groups present in HEMA via a condensation reaction to produce flame retardant MMA monomer (MMAP) in accordance with some embodiments of the present invention may be either obtained commercially or synthesized. For example, suitable phosphorus-containing monomers that may be obtained commercially include, but are not limited to, diphenyl phosphoryl chloride, diphenylphosphinic chloride, diethyl chlorophosphate, dimethyl chlorophosphate, diisopropyl chlorophosphate, chlorodiphenylphosphine, and combinations thereof. Generally, suitable phosphorus-containing monomers include, but are not limited to, phosphonic chlorides, chlorophosphates, alkyl/aryl phosphonates, or other phosphorus-containing monomers known for flame retardancy (e.g., phosphinates, phosphonates, phosphate esters, and combinations thereof).

Phosphonic chlorides and chlorophosphates are listed among the suitable phosphorus-containing monomers for purposes of illustration, not limitation. Suitable phosphorus-containing monomers may alternatively contain other halogen atoms or hydrogen atoms that participate in the condensation reaction in lieu of chlorine atoms.

Suitable phosphorus-containing monomers also include (or may be synthesized from) conventional phosphorus-based flame retardants, such as phosphonates (e.g., dimethyl methyl phosphonate; diethyl ethyl phosphonate; dimethyl propyl phosphonate; diethyl N,N-bis(2-hydroxyethyl) amino methyl phosphonate; phosphonic acid, methyl(5-methyl-2-methyl-1,3,2-dioxaphosphorinan-5-y) ester, P,P'-dioxide; and phosphonic acid, methyl(5-methyl-2-methyl-1,3,2-dioxaphosphorinan-5-yl) methyl, methyl ester, P-oxide), phosphate esters (e.g., triethyl phosphate; tributyl phosphate; trioctyl phosphate; and tributoxyethyl phosphate), and phosphinates.

A conventional phosphorus-based flame retardant typically includes one or more of a phosphonate, a phosphate ester, or a phosphinate. Conventional phosphorus-based flame retardants that are phosphonates have the following generic molecular structure:

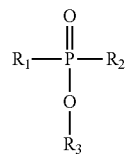

where $R_1$, $R_2$ and $R_3$ are organic substituents (e.g., alkyl, aryl, etc.) that may be the same or different.

Conventional phosphorus-based flame retardants that are phosphate esters have the following generic molecular structure:

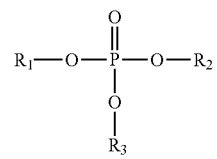

where $R_1$, $R_2$ and $R_3$ are organic substituents (e.g., alkyl, aryl, etc.) that may be the same or different.

Conventional phosphorus-based flame retardants that are phosphinates have the following generic molecular structure:

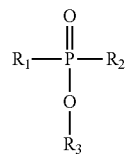

where $R_1$, $R_2$ and $R_3$ are organic substituents (e.g., alkyl, aryl, etc.) that may be the same or different.

One or more of the above conventional phosphorus-based flame retardants (i.e., phosphonate, phosphate ester, and/or phosphinate) and/or other conventional phosphate-based flame retardants may be functionalized (e.g., halogenated) using procedures well known to those skilled in the art to produce functionalized phosphorus-containing monomers suitable for reacting with the hydroxyl groups present in HEMA via a condensation reaction to produce a flame retardant MMA monomer (MMAP) in accordance with some embodiments of the present invention. Hence, either halogen atoms of functionalized phosphorus-containing monomers or hydrogen atoms of the conventional phosphorus-based flame retardants may participate in the condensation reaction.

In general, independent of the particular phosphorous-containing monomer utilized in Reaction Scheme 1, the flame retardant MMA monomer (MMAP) produced via Reaction Scheme 1 may be represented by the following formula:

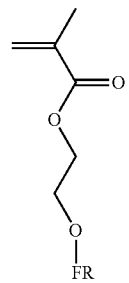

where FR is a phosphorus-containing moiety.

The flame retardant MMA monomer (MMAP) produced via Reaction Scheme 1 may be either homopolymerized to yield poly(MMAP) or copolymerized with MMA to yield poly(MMA-co-MMAP). Reaction Scheme 2, below, sets forth an example reaction scheme that may be utilized to copolymerize the flame retardant MMA monomer (MMAP) produced via Reaction Scheme 1 with MMA to yield poly (MMA-co-MMAP).

Reaction Scheme 2

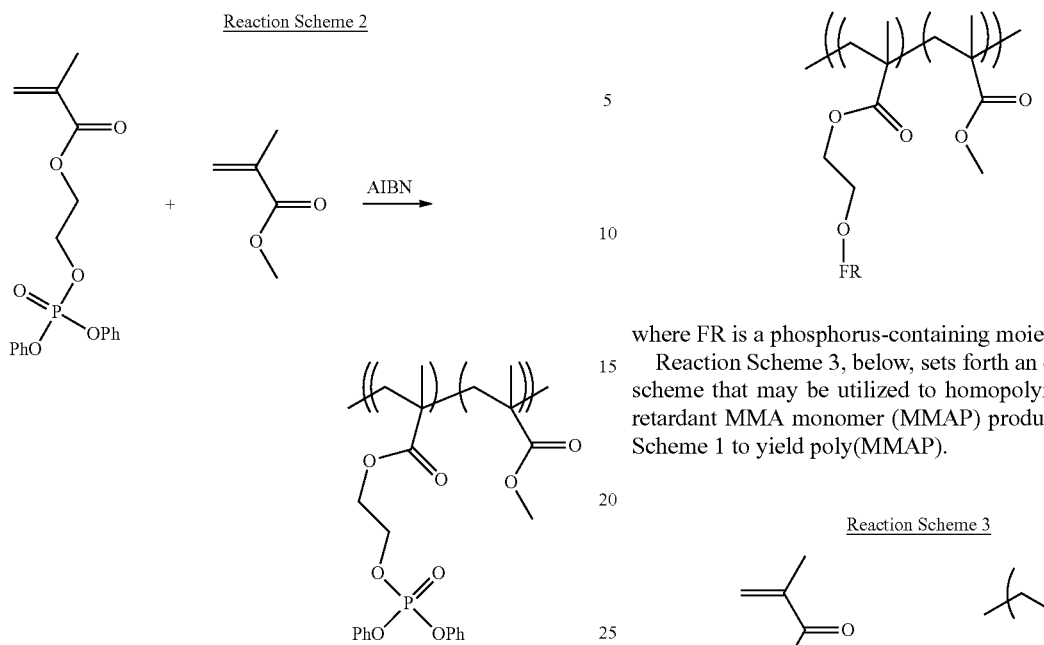

where Ph is a phenyl group. In Reaction Scheme 2, poly (MMA-co-MMAP) copolymer is prepared via free radical polymerization using azobisisobutyronitrile (AIBN) as an initiator. The use of AIBN as an initiator is exemplary. One skilled in the art will appreciate that one or more other suitable initiators may be used in lieu of, or in addition to, AIBN. Suitable initiators include, but are not limited to, azonitriles and peroxides.

PROPHETIC EXAMPLE 2

Synthesis of the Poly(MMA-co-MMAP) Copolymer of Reaction Scheme 2

To a 25 mL round bottom flask, flame retardant MMA monomer (i.e., the MMAP produced via Reaction Scheme 1) (1 g, 2.8 mmol), MMA (2.65 mL, 2.49 g, 24.8 mmol), and 10 mL toluene are added, along with a stir bar and azobisisobutyronitrile (AIBN) (22.7 mg, 0.14 mmol) as an initiator. The reaction is degas sed by bubbling with nitrogen gas for 30 minutes, after which it is heated to 70° C. for 18 hours. The resulting solution was precipitated into 250 mL cold methanol and filtered to reveal polymer. *End of Prophetic Example 2*

Although polymerization of the flame retardant MMA monomer (MMAP) using AIBN is shown in Reaction Scheme 2, one skilled in the art will appreciate that generally any of the known processes for polymerizing such a monomer may be used to prepare the poly(MMA-co-MMAP) copolymer. Such processes include, but are not limited to, free radical polymerization and atom transfer radical polymerization (ATRP). In general, bulk and solution polymerization processes, using one or more solvents such as dimethylformamide (DMF), N-methyl-2-pyrrolidone (NMP), and dimethyl sulfoxide (DMSO), are particularly suitable.

In general, independent of the particular phosphorous-containing monomer utilized in Reaction Scheme 1, the poly (MMA-co-MMAP) copolymer produced via Reaction Scheme 2 may be represented by the following formula:

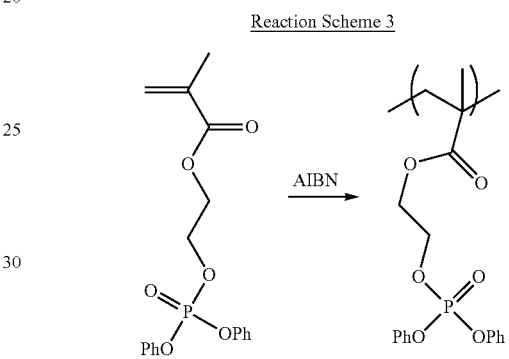

where FR is a phosphorus-containing moiety.

Reaction Scheme 3, below, sets forth an example reaction scheme that may be utilized to homopolymerize the flame retardant MMA monomer (MMAP) produced via Reaction Scheme 1 to yield poly(MMAP).

Reaction Scheme 3 where Ph is a phenyl group. In Reaction Scheme 3, poly (MMAP) homopolymer is prepared via free radical polymerization using azobisisobutyronitrile (AIBN) as an initiator. The use of AIBN as an initiator is exemplary. One skilled in the art will appreciate that one or more other suitable initiators may be used in lieu of, or in addition to, AIBN. Suitable initiators include, but are not limited to, azonitriles and peroxides.

PROPHETIC EXAMPLE 3

Synthesis of the Poly(MMAP) Homopolymer of Reaction Scheme 3

To a 25 mL round bottom flask, flame retardant MMA monomer (i.e., the MMAP produced via Reaction Scheme 1) (3 g, 8.3 mmol) and 10 mL toluene are added, along with a stir bar and azobisisobutyronitrile (AIBN) (6.8 mg, 0.04 mmol) as an initiator. The reaction is degassed by bubbling with nitrogen gas for 30 minutes, after which it is heated to 70° C. for 18 hours. The resulting solution was precipitated into 250 mL cold methanol and filtered to reveal polymer. *End of Prophetic Example 3*

Although polymerization of the flame retardant MMA monomer (MMAP) using AIBN is shown in Reaction Scheme 3, one skilled in the art will appreciate that generally any of the known processes for polymerizing such a monomer may be used to prepare the poly(MMAP) homopolymer. Such processes include, but are not limited to, free radical polymerization and atom transfer radical polymerization (ATRP). In general, bulk and solution polymerization processes, using one or more solvents such as dimethylformamide (DMF), N-methyl-2-pyrrolidone (NMP), and dimethyl sulfoxide (DMSO), are particularly suitable.

In general, independent of the particular phosphorous-containing monomer utilized in Reaction Scheme 1, the poly(MMAP) homopolymer produced via Reaction Scheme 3 may be represented by the following formula:

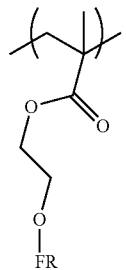

where FR is a phosphorus-containing moiety.

The FR-PMMA (i.e., the poly(MMA-co-MMAP) copolymer produced via Reaction Scheme 2 and/or the poly(MMAP) homopolymer produced via Reaction Scheme 3) is then blended with PLA, or blended with PMMA and PLA to form a ternary blend. For example, the poly(MMA-co-MMAP) copolymer produced via Reaction Scheme 2 may be blended with PMMA and PLA to form a ternary blend of PMMA/PLA/poly(MMA-co-MMAP).

In accordance with some embodiments of the present invention, more elaborate copolymers (these copolymers are also referred to herein as "FR-PMMA/PLA copolymers") are formed that include both FR-PMMA and PLA components, which can be used in lieu of PMMA/PLA blends, or in conjunction with PLA, PMMA, or PMMA/PLA blends. In the latter case (i.e., a FR-PMMA/PLA copolymer that is used in conjunction with a PMMA/PLA blend), the FR-PMMA/PLA copolymer serves the dual function of being flame retardant and behaving as a compatibilizers.

In accordance with some embodiments of the present invention, a flame retardant acrylic/polylactic acid (PLA) copolymer is synthesized which contains a poly(MMAP) block or a poly(MMA-co-MMAP) block, wherein MMA is methyl methacrylate and MMAP is a MMA-like monomer that is functionalized with a phosphorus-containing moiety. The poly(MMAP) block may be, for example, represented by the following formula:

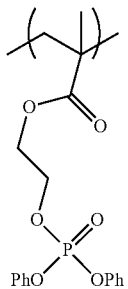

where Ph is a phenyl group. The poly(MMA-co-MMAP) block may be, for example, represented by the following formula:

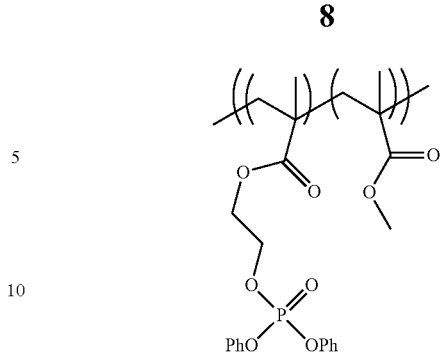

where Ph is a phenyl group. In some embodiments, the flame retardant acrylic/PLA copolymer is a diblock copolymer containing a PLA block and a FR-PMMA block (i.e., either a poly(MMAP) block or a poly(MMA-co-MMAP) block). An exemplary synthetic procedure that may be used to produce such a diblock copolymer is shown in FIG. 1, described below. In other embodiments, the flame retardant acrylic/PLA copolymer is a triblock-graft copolymer containing a PLA block, a PMMA block and a FR-PMMA block (i.e., either a poly(MMAP) block or a poly(MMA-co-MMAP) block). Exemplary synthetic procedures that may be used to produce such triblock-graft copolymers are shown in FIGS. 2 and 3, described below.

Figure 2:
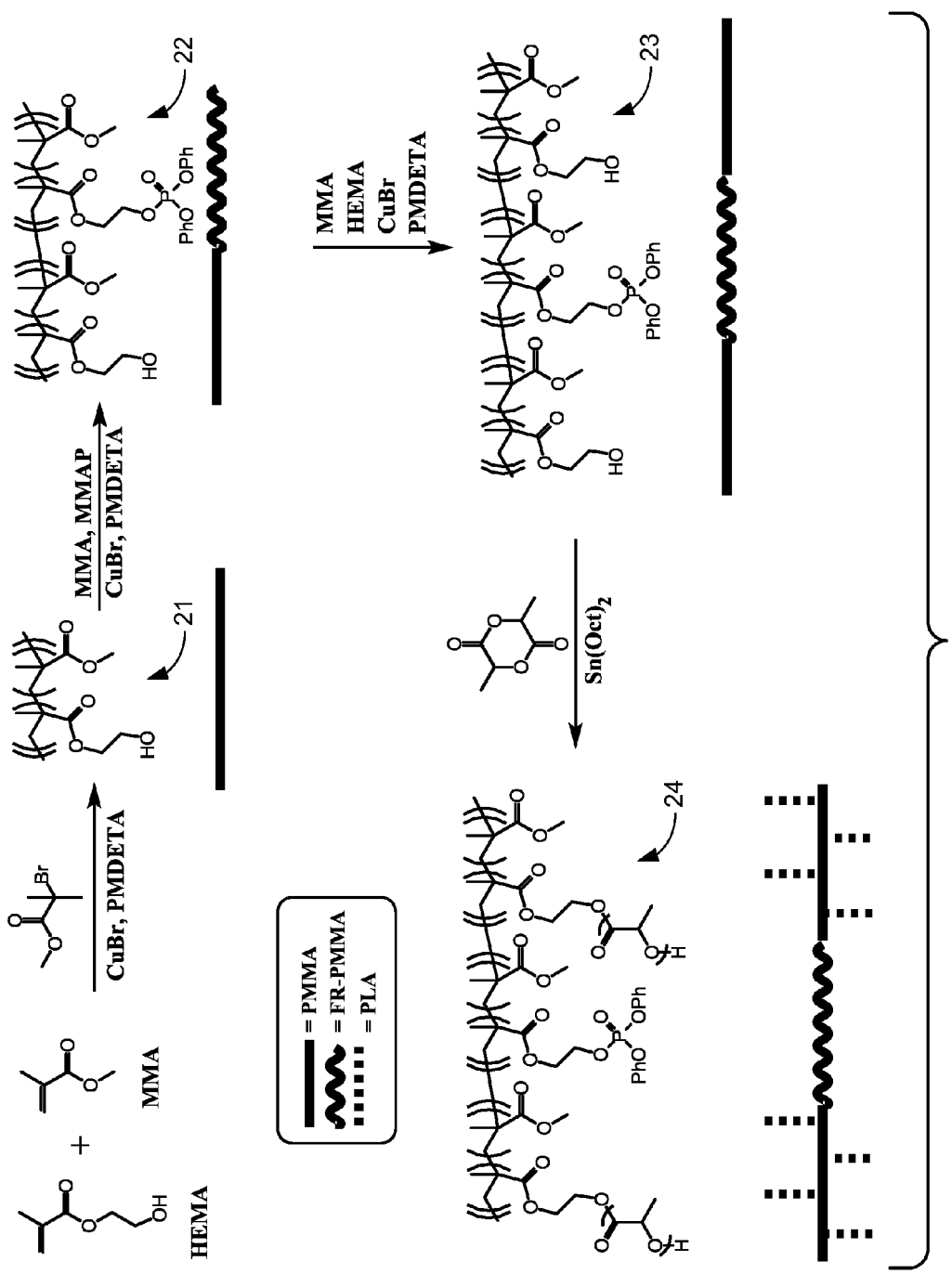
FIG. 2 illustrates a synthetic procedure that may be used to produce a flame retardant acrylic/PLA triblock-graft copolymer PLA grafted outer blocks, linear PMMA outer blocks, and a linear poly(MMA-co-MMAP) inner block in accordance with some embodiments of the present invention.
Figure 3:
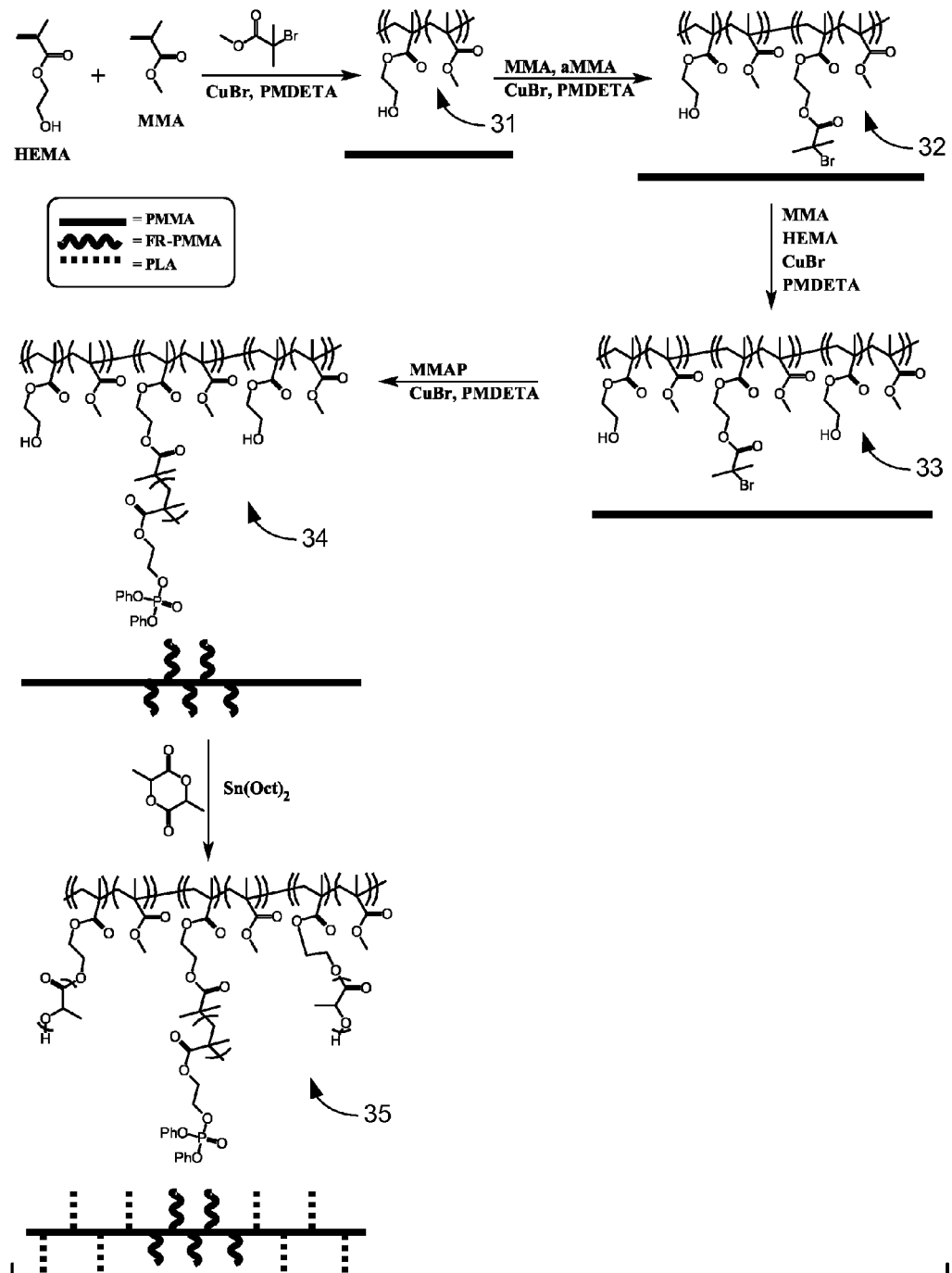
FIG. 3 illustrates a synthetic procedure that may be used to produce a flame retardant acrylic/PLA triblock-graft copolymer containing a linear PMMA block, PLA grafted outer blocks, and poly(MMAP) grafted inner blocks in accordance with some embodiments of the present invention.

Each of the exemplary synthetic procedures illustrated in FIGS. 1-3 can be tailored to achieve the desired physical properties of the resulting polymer, thereby enabling exceptional flexibility in the synthesis of flame retardant acrylic/PLA copolymers.

FIG. 1 illustrates a synthetic procedure that may be used to produce a flame retardant acrylic/PLA diblock copolymer containing a PLA block and a poly(MMA-co-MMAP) block in accordance with some embodiments of the present invention. The flame retardant acrylic/PLA diblock copolymer synthesized in FIG. 1 is exemplary, as is the synthetic procedure illustrated in FIG. 1.

In FIG. 1, the exemplary flame retardant acrylic/PLA diblock copolymer is synthesized in two steps. In the first step, 2-hydroxyethyl 2-bromoisobutyrate (HEBIB) and lactide are reacted in the presence of tin(II) 2-ethylhexanoate ($Sn(Oct)_2$) via ring-opening polymerization (ROP) to prepare a brominated PLA-based polymer 11. In the second step, the brominated PLA-based polymer 11, MMA, and the MMAP monomer (produced via Reaction Scheme 1) are reacted in the presence of CuBr and N,N,N',N',N"-pentamethyldiethylenetriamine (PMDETA) via atom transfer radical polymerization (ATRP) to prepare a flame retardant acrylic/PLA diblock copolymer 12 containing the PLA block and the poly(MMAP-co-MMAP) block. In FIG. 1, the PLA block is represented by the bold dotted line, whereas the FR_PMMA block is represented by the bold curly line.

PROPHETIC EXAMPLE 4

Synthesis of the Exemplary Flame Retardant Acrylic/PLA Diblock Copolymer 12 Illustrated in FIG. 1

Step One. A solution of stannous octoate ($Sn(Oct)_2$) in anhydrous toluene (0.1 mL of 0.5 M solution) is added to a flask, and the solvent is removed in vacuo. Lactide (5 g, 34.7 mmol) and 2-hydroxyethyl 2-bromoisobutyrate (HEBIB) (26.4 mg, 0.125 mmol) are added to the flask, along with a magnetic stirrer. The flask is fitted with a rubber septum protected with a stream of $N_2$ flow for at least 30 minutes. The polymerization is carried out under stirring at 130° C. Polymerization occurs over a period of 5 hours. Generally, polymerization of the lactide via ROP may be performed in toluene at 110° C. or in the melt at 110-180° C.

The crude brominated PLA-based polymer reaction product is dissolved in chloroform ($CHCl_3$), recovered by precipitation in cold methanol, filtrated, and dried up to constant weight.

Step Two. To a first flask are added CuBr (14.4 mg, 0.1 mmol), N,N,N',N',N"-pentamethyldiethylenetriamine (PMDETA) (17.2 mg, 0.1 mmol), and toluene (1 mL) as well as a magnetic stirrer. The first flask is fitted with a rubber septum and degassed with three successive cycles of freeze-pump-thaw.

To a second flask are added brominated PLA-based polymer 11 (4 g, 0.1 mmol) prepared in the first step of this example, MMA (2.85 g, 28.5 mmol), MMAP (1.16 g, 3.2 mmol) prepared in Prophetic Example 1, and toluene (10 mL). Generally, the ratio of $[MMA+MMAP]_0/[brominated$ PLA-based polymer $11]_0$ that may be used ranges from 50 to 500. The second flask is fitted with a rubber septum and degassed by bubbling with $N_2$ flow for at least 30 minutes. This mixture is then transferred into the first flask and the polymerization is carried out under stirring at 70° C. Polymerization occurs over a period of 0.5-12 hours. Generally, the polymerization of MMA and MMAP via ATRP may be performed in toluene at 60-100° C. for a $[MMA+MMAP]_0$ of 0.5-5 M and $[MMA+MMAP]_0/[brominated$ PLA-based polymer $11]_0$ of 50-500.

Copper catalyst is removed by passing the reaction mixture diluted with THF through an alumina gel column.

The reaction product (i.e., the flame retardant acrylic/PLA diblock copolymer 12) is recovered by precipitation in 7-fold excess of cold methanol, filtrated and dried up to constant weight. *End of Prophetic Example 4*

In general, independent of the particular phosphorous-containing monomer utilized in Reaction Scheme 1, the flame retardant acrylic/PLA diblock copolymer containing the PLA block and the poly(MMAP-co-MMAP) block produced via the synthetic procedure illustrated in FIG. 1 may be represented by the following formula:

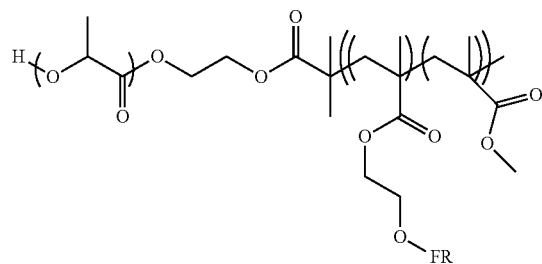

where FR is a phosphorus-containing moiety.

Also, in general, independent of the particular phosphorous-containing monomer utilized in Reaction Scheme 1, a flame retardant acrylic/PLA diblock copolymer containing a PLA block and a poly(MMAP) block may be produced via a modified-version of the synthetic procedure illustrated in FIG. 1 by omitting the MMA reactant from the second step, and may be represented by the following formula:

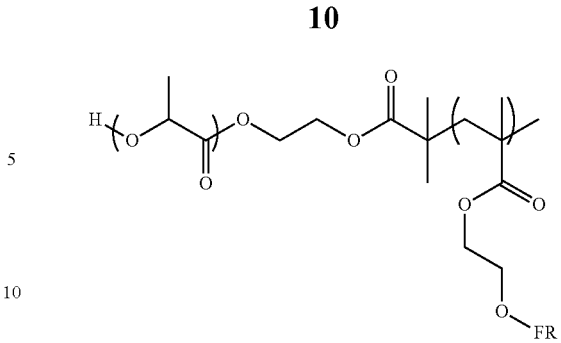

where FR is a phosphorus-containing moiety.

More elaborate analogues of this approach include triblock-graft copolymers containing PLA-rich outer blocks and a FR-PMMA inner block. Contrary to the diblock copolymer illustrated in FIG. 1, the triblock-graft copolymers illustrated in FIGS. 2 and 3 are less phosphorus-rich, which allows for greater preservation of the inherent material properties of PMMA/PLA blends. The triblock-graft copolymers are made either with a linear FR-PMMA inner block (a triblock-graft copolymer containing a linear poly(MMA-co-PMMA) inner block is illustrated in FIG. 2) or a FR-PMMA grafted inner block (a triblock-graft copolymer containing a poly(PMMA) grafted inner block is illustrated in FIG. 3). The triblock-graft copolymer illustrated in FIG. 2 allows for ease of processability of PLA films, owing to its high PLA content, whereas the triblock-graft copolymer illustrated in FIG. 3 creates greater flexibility in modifying the phosphorus content without significantly altering the base polymer properties.

FIG. 2 is a synthetic procedure that may be used to produce a flame retardant acrylic/PLA triblock-graft copolymer containing PLA grafted outer blocks, linear PMMA outer blocks, and a linear poly(MMA-co-MMAP) inner block in accordance with some embodiments of the present invention. The flame retardant acrylic/PLA triblock-graft copolymer shown in FIG. 2 is exemplary, as is the synthetic procedure illustrated in FIG. 2.

In FIG. 2, the exemplary flame retardant acrylic/PLA triblock-graft copolymer is synthesized in four steps. In the first step, 2-hydroxyethyl methacrylate (HEMA) and MMA are reacted in the presence of methyl α-bromoisobutyrate, CuBr and N,N,N',N',N"-pentamethyldiethylenetriamine (PMDETA) via atom transfer radical polymerization (ATRP) to prepare a MMA-based copolymer 21. In the second step, the MMA-based copolymer 21, MMA and the MMAP monomer (produced via Reaction Scheme 1) are reacted in the presence of CuBr and PMDETA via ATRP to prepare a diblock copolymer 22 containing a PMMA block and a poly(MMA-co-MMAP) block. In the third step, the diblock copolymer 22, MMA and HEMA are reacted in the presence of CuBr and PMDETA via ATRP to prepare a triblock copolymer 23 containing linear PMMA outer blocks and a linear poly(MMA-co-MMAP) inner block. In the fourth step, the triblock copolymer 23 and lactide are reacted in the presence of tin(II) 2-ethylhexanoate ($Sn(Oct)_2$) via ring-opening polymerization (ROP) to prepare a flame retardant acrylic/PLA triblock-graft copolymer 24 containing PLA grafted outer blocks, the linear PMMA outer blocks, and the linear poly(MMA-co-MMAP) inner block. In FIG. 2, the PLA grafted outer blocks are each represented by a bold dotted line, the linear PMMA outer blocks are each represented by a bold solid line, and the linear FR_PMMA inner block is represented by a bold curly line.

PROPHETIC EXAMPLE 5

Synthesis of the Exemplary Flame Retardant
Acrylic/PLA Triblock-Graft Copolymer 24
Illustrated in FIG. 2

Step One. To a first flask are added CuBr (14.4 mg, 0.1 mmol), N,N,N',N',N"-pentamethyldiethylenetriamine (PMDETA) (17.2 mg, 0.1 mmol), and toluene (1 mL) as well as a magnetic stirrer. The first flask is fitted with a rubber septum and degassed with three successive cycles of freeze-pumpthaw.

To a second flask are added methyl α-bromoisobutyrate (18.1 mg, 0.1 mmol), 2-hydroxyethyl methacrylate (HEMA) (0.25 g, 1.94 mmol), MMA (1.75 g, 17.5 mmol), and toluene (10 mL). Generally, the ratio of $[HEMA+MMA]_0/[methyl$ $\alpha$-bromoisobutyrate$]_0$ that may be used ranges from 50 to 500. The second flask is fitted with a rubber septum and degassed by bubbling with $N_2$ flow for at least 30 minutes. This mixture is then transferred into the first flask and the polymerization is carried out under stifling at 70° C. Polymerization occurs over a period of 0.5-12 hours. Generally, the polymerization of HEMA and MMA via ATRP may be performed in toluene at 60-100° C. for a $[HEMA+MMA]_0$ of 0.5-5 M and $[HEMA+MMA]_0/[methyl\ \alpha$-bromoisobutyrate]o of 50-500.

Copper catalyst is removed by passing the reaction mixture diluted with THF through an alumina gel column.

The reaction product (i.e., the MMA-based copolymer 21) is recovered by precipitation in 7-fold excess of cold methanol, filtrated and dried up to constant weight.

Step Two. To a first flask are added CuBr (14.4 mg, 0.1 mmol), N,N,N',N',N"-pentamethyldiethylenetriamine (PMDETA) (17.2 mg, 0.1 mmol), and toluene (1 mL) as well as a magnetic stirrer. The first flask is fitted with a rubber septum and degassed with three successive cycles of freeze-pumpthaw.

To a second flask are added MMA-based copolymer 21 (2 g, 0.1 mmol) prepared in the first step of this example, MMA (1.43 g, 14.3 mmol), MMAP (0.58 g, 1.8 mmol) prepared in Prophetic Example 1, and toluene (10 mL). Generally, the ratio of $[MMA+MMAP]_0/[MMA$-based copolymer 21$]_0$ that may be used ranges from 50 to 500. The second flask is fitted with a rubber septum and degassed by bubbling with N2 flow for at least 30 minutes. This mixture is then transferred into the first flask and the polymerization is carried out under stifling at 70° C. Polymerization occurs over a period of 0.5-12 hours. Generally, the polymerization of MMA and MMAP via ATRP may be performed in toluene at 60-100° C. for a $[MMA+MMAP]_0$ of 0.5-5 M and $[MMA+MMAP]_0/[MMA$-based copolymer 21$]_0$ of 50-500.

Copper catalyst is removed by passing the reaction mixture diluted with THF through an alumina gel column.

The reaction product (i.e., the diblock copolymer 22) is recovered by precipitation in 7-fold excess of cold methanol, filtrated and dried up to constant weight.

Step Three. To a first flask are added CuBr (14.4 mg, 0.1 mmol), N,N,N',N',N"-pentamethyldiethylenetriamine (PMDETA) (17.2 mg, 0.1 mmol), and toluene (1 mL) as well as a magnetic stirrer. The first flask is fitted with a rubber septum and degassed with three successive cycles of freeze-pumpthaw.

To a second flask are added diblock copolymer 22 (4 g, 0.1 mmol) prepared in the second step of this example, 2-hydroxyethyl methacrylate (HEMA) (0.25 g, 1.94 mmol), MMA (1.75 g, 17.5 mmol), and toluene (10 mL). Generally, the ratio of $[HEMA+MMA]_0/[diblock\ copolymer\ 22]_0$ that may be used ranges from 50 to 500. The second flask is fitted with a rubber septum and degassed by bubbling with N2 flow for at least 30 minutes. This mixture is then transferred into the first flask and the polymerization is carried out under stirring at 70° C. Polymerization occurs over a period of 0.5-12 hours. Generally, the polymerization of HEMA and MMA via ATRP may be performed in toluene at 60-100° C. for a $[HEMA+MMA]_0$ of 0.5-5 M and $[HEMA+MMA]_0/$ $[diblock\ copolymer\ 22]_0$ of 50-500.

Copper catalyst is removed by passing the reaction mixture diluted with THF through an alumina gel column.

The reaction product (i.e., the triblock copolymer 23) is recovered by precipitation in 7-fold excess of cold methanol, filtrated and dried up to constant weight.

Step Four. A solution of stannous octoate $(Sn(Oct)_2)$ in anhydrous toluene (0.4 mL of 0.5 M solution) is added to a flask, and the solvent is removed in vacuo. Lactide (19.4 g, 134.6 mmol) and the triblock copolymer 23 (6 g, 0.1 mmol) produced in the third step of this example are added to the flask, along with a magnetic stirrer. The flask is fitted with a rubber septum and protected under a stream of $N_2$ flow for at least 30 minutes. The polymerization is carried out under stirring at 130° C. Polymerization occurs over a period of 5 hours. Generally, polymerization of the lactide via ROP may be performed in toluene at 110° C. or in the melt at 110-180° C.

The crude reaction product (i.e., the flame retardant acrylic/PLA triblock-graft copolymer 24) is dissolved in chloroform ($CHCl_3$), recovered by precipitation in cold methanol, filtrated, and dried up to constant weight. *End of Prophetic Example 5*

In general, independent of the particular phosphorous-containing monomer utilized in Reaction Scheme 1, the flame retardant acrylic/PLA triblock-graft copolymer containing PLA grafted outer blocks, linear PMMA outer blocks, and the linear poly(MMA-co-MMAP) inner block produced via the synthetic procedure illustrated in FIG. 2 may be represented by the following formula:

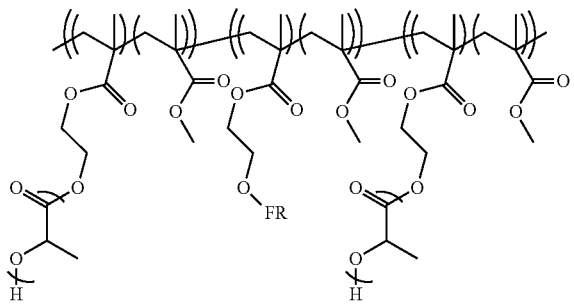

where FR is a phosphorus-containing moiety.

Also, in general, independent of the particular phosphorous-containing monomer utilized in Reaction Scheme 1, a flame retardant acrylic/PLA triblock-graft copolymer containing PLA grafted outer blocks, linear PMMA outer blocks, and a linear poly(MMAP) inner block may be produced via a modified-version of the synthetic procedure illustrated in FIG. 2 by omitting the MMA reactant from the second step, and may be represented by the following formula:

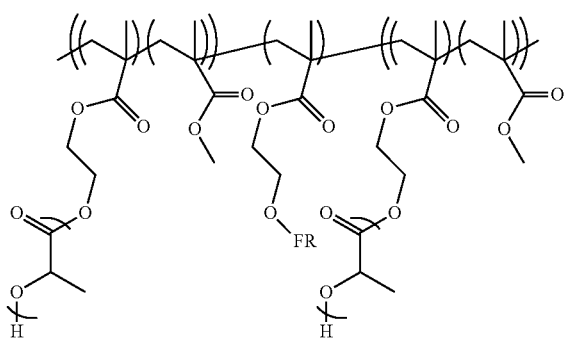

where FR is a phosphorus-containing moiety.

FIG. 3 illustrates a synthetic procedure that may be used to produce a flame retardant acrylic/PLA triblock-graft copolymer containing a linear PMMA block, PLA grafted outer blocks, and poly(MMAP) grafted inner blocks in accordance with some embodiments of the present invention. The flame retardant acrylic/PLA triblock copolymer shown in FIG. 3 is exemplary, as is the synthetic procedure illustrated in FIG. 3.

In FIG. 3, the exemplary flame retardant acrylic/PLA triblock-graft copolymer is synthesized in five steps. In the first step, 2-hydroxyethyl methacrylate (HEMA) and MMA are reacted in the presence of methyl α-bromoisobutyrate, CuBr and N,N,N',N',N"-pentamethyldiethylenetriamine (PMDETA) via atom transfer radical polymerization (ATRP) to prepare a MMA-based copolymer 31. In the second step, the MMA-based copolymer 31 and α-bromoisobutyrylethyl methacrylate (aMMA) are reacted in the presence of CuBr and PMDETA via ATRP to prepare a MMA-based copolymer 32. In the third step, the MMA-based copolymer 32, MMA and HEMA are reacted in the presence of CuBr and PMDETA via ATRP to prepare a MMA-based copolymer 33. In the fourth step, the MMA-based copolymer 33 and the MMAP monomer (produced via Reaction Scheme 1) are reacted in the presence of CuBr and PMDETA via ATRP to prepare a copolymer 34 containing an inner linear PMMA block and poly(MMAP) grafted inner blocks. In the fifth step, the copolymer 34 and lactide are reacted in the presence of tin(II) 2-ethylhexanoate (Sn(Oct)$_2$) via ring-opening polymerization (ROP) to prepare a triblock-graft copolymer 35 containing the linear PMMA block, the poly(MMAP) grafted inner blocks, and PLA grafted outer blocks. In this ROP reaction, the hydroxyl groups present in copolymer 34 serve as synthetic handles. In FIG. 3, the PLA grafted outer blocks are each represented by a bold dotted line, the linear PMMA block is represented by a bold solid line, and the FR_PMMA grafted inner blocks are each represented by a bold curly line.

PROPHETIC EXAMPLE 6

Synthesis of the Exemplary Flame Retardant Acrylic/PLA Triblock-Graft Copolymer 35 Illustrated in FIG. 3

Step One. To a first flask are added CuBr (14.4 mg, 0.1 mmol), N,N,N',N',N"-pentamethyldiethylenetriamine (PMDETA) (17.2 mg, 0.1 mmol), and toluene (1 mL) as well as a magnetic stirrer. The first flask is fitted with a rubber septum and degassed with three successive cycles of freeze-pump-thaw.

To a second flask are added methyl α-bromoisobutyrate (18.1 mg, 0.1 mmol), 2-hydroxyethyl methacrylate (HEMA) (0.25 g, 1.94 mmol), MMA (1.75 g, 17.5 mmol), and toluene (10 mL). Generally, the ratio of [HEMA+MMA]$_0$/[methyl α-bromoisobutyrate]$_0$ that may be used ranges from 50 to 500. The second flask is fitted with a rubber septum and degassed by bubbling with N$_2$ flow for at least 30 minutes. This mixture is then transferred into the first flask and the polymerization is carried out under stifling at 70° C. Polymerization occurs over a period of 0.5-12 hours. Generally, the polymerization of HEMA and MMA via ATRP may be performed in toluene at 60-100° C. for a [HEMA+MMA]$_0$ of 0.5-5 M and [HEMA+MMA]$_0$/[methyl α-bromoisobutyrate]$_0$ of 50-500.

Copper catalyst is removed by passing the reaction mixture diluted with THF through an alumina gel column.

The reaction product (i.e., the MMA-based copolymer 31) is recovered by precipitation in 7-fold excess of cold methanol, filtrated and dried up to constant weight.

Step Two. To a first flask are added CuBr (14.4 mg, 0.1 mmol), N,N,N',N',N"-pentamethyldiethylenetriamine (PMDETA) (17.2 mg, 0.1 mmol), and toluene (1 mL) as well as a magnetic stirrer. The first flask is fitted with a rubber septum and degassed with three successive cycles of freeze-pump-thaw.

To a second flask are added the MMA-based copolymer 31 (2 g, 0.1 mmol) prepared in the first step of this example, MMA (1.53 g, 15.3 mmol), aMMA (0.47 g, 1.7 mmol), and toluene (10 mL). Generally, the ratio of [MMA+aMMA]$_0$/[MMA-based copolymer 31]$_0$ that may be used ranges from 50 to 500. The second flask is fitted with a rubber septum and degassed by bubbling with N$_2$ flow for at least 30 minutes. This mixture is then transferred into the first flask and the polymerization is carried out under stirring at 70° C. Polymerization occurs over a period of 0.5-12 hours. Generally, the polymerization of MMA and aMMA via ATRP may be performed in toluene at 60-100° C. for a [MMA+aMMA]$_0$ of 0.5-5 M and [MMA+aMMA]$_0$/[MMA-based copolymer 31]$_0$ of 50-500.

Copper catalyst is removed by passing the reaction mixture diluted with THF through an alumina gel column.

The reaction product (i.e., the MMA-based copolymer 32) is recovered by precipitation in 7-fold excess of cold methanol, filtrated and dried up to constant weight.

Step Three. To a first flask are added CuBr (14.4 mg, 0.1 mmol), N,N,N',N',N"-pentamethyldiethylenetriamine (PMDETA) (17.2 mg, 0.1 mmol), and toluene (1 mL) as well as a magnetic stirrer. The first flask is fitted with a rubber septum and degassed with three successive cycles of freeze-pump-thaw.

To a second flask are added the MMA-based copolymer 32 (4 g, 0.1 mmol) prepared in the second step of this example, 2-hydroxyethyl methacrylate (HEMA) (0.25 g, 1.94 mmol), MMA (1.75 g, 17.5 mmol), and toluene (10 mL). Generally, the ratio of [HEMA+MMA]$_0$/[MMA-based copolymer 32]$_0$ that may be used ranges from 50 to 500. The second flask is fitted with a rubber septum and degassed by bubbling with N2 flow for at least 30 minutes. This mixture is then transferred into the first flask and the polymerization is carried out under stifling at 70° C. Polymerization occurs over a period of 0.5-12 hours. Generally, the polymerization of HEMA and MMA via ATRP may be performed in toluene at 60-100° C. for a [HEMA+MMA]$_0$ of 0.5-5 M and [HEMA+MMA]$_0$/[MMA-based copolymer 32]o of 50-500.

Copper catalyst is removed by passing the reaction mixture diluted with THF through an alumina gel column.

The reaction product (i.e., the MMA-based copolymer 33) is recovered by precipitation in 7-fold excess of cold methanol, filtrated and dried up to constant weight.

Step Four. To a first flask are added CuBr (244.8 mg, 1.7 mmol), N,N,N',N',N"-pentamethyldiethylenetriamine (PMDETA) (292.4 mg, 1.7 mmol), and toluene (1 mL) as well as a magnetic stirrer. The first flask is fitted with a rubber septum and degassed with three successive cycles of freeze-pump-thaw.

To a second flask are added the MMA-based copolymer 33 (6 g, 0.1 mmol) prepared in the third step of this example, MMAP (8.5 g, 23.46 mmol) prepared in Prophetic Example 1, and toluene (10 mL). Generally, the ratio of [MMAP]$_0$/[MMA-based copolymer 33]$_0$ that may be used ranges from 50 to 500. The second flask is fitted with a rubber septum and degassed by bubbling with N$_2$ flow for at least 30 minutes. This mixture is then transferred into the first flask and the polymerization is carried out under stifling at 70° C. Polymerization occurs over a period of 0.5-12 hours. Generally, the polymerization of MMAP via ATRP may be performed in toluene at 60-100° C. for a [MMAP]$_0$ of 0.5-5 M and [MMAP]$_0$/[MMA-based copolymer 33]$_0$ of 50-500.

Copper catalyst is removed by passing the reaction mixture diluted with THF through an alumina gel column.

The reaction product (i.e., the copolymer 34) is recovered by precipitation in 7-fold excess of cold methanol, filtrated and dried up to constant weight.

Step Five. A solution of stannous octoate (Sn(Oct)$_2$) in anhydrous toluene (0.2 mL of 0.5 M solution) is added to a flask, and the solvent is removed in vacuo. Lactide (7.76 g, 53.8 mmol) and the triblock copolymer 34 (14.5 g, 0.1 mmol) produced in the fourth step of this example are added to the flask, along with a magnetic stirrer. The flask is fitted with a rubber septum and protected under a stream of N$_2$ flow for at least 30 minutes. The polymerization is carried out under stirring at 130° C. Polymerization occurs over a period of 5 hours. Generally, polymerization of the lactide via ROP may be performed in toluene at 110° C. or in the melt at 110-180° C.

The crude reaction product (i.e., the flame retardant acrylic/PLA triblock-graft copolymer 35) is dissolved in chloroform (CHCl$_3$), recovered by precipitation in cold methanol, filtrated, and dried up to constant weight. *End of Prophetic Example 6*

In general, independent of the particular phosphorous-containing monomer utilized in Reaction Scheme 1, the flame retardant acrylic/PLA triblock-graft copolymer containing the linear PMMA block, PLA grafted outer blocks, and poly(MMAP) grafted inner blocks produced via the synthetic procedure illustrated in FIG. 3 may be represented by the following formula:

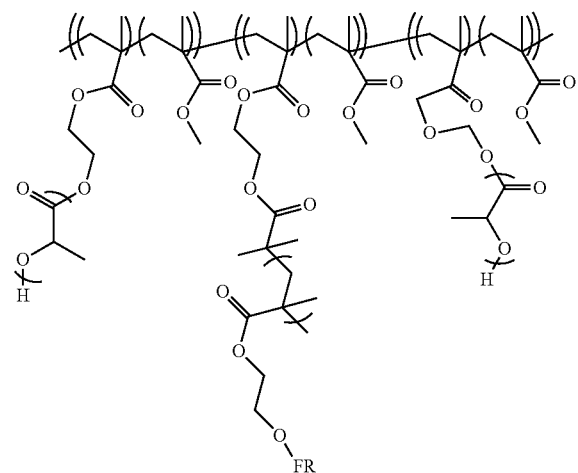

where FR is a phosphorus-containing moiety.

Also, in general, independent of the particular phosphorous-containing monomer utilized in Reaction Scheme 1, a flame retardant acrylic/PLA triblock-graft copolymer containing a linear PMMA block, PLA grafted outer blocks, and poly(MMAP) grafted inner blocks may be produced via a modified version of the synthetic procedure illustrated in FIG. 3 by adding a MMA reactant to the fourth step, and may be represented by the following formula:

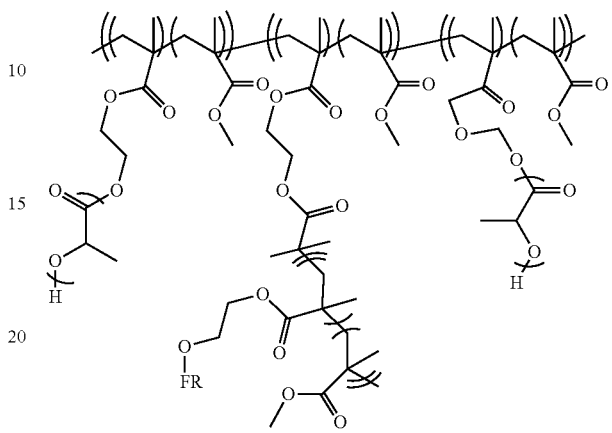

where FR is a phosphorus-containing moiety.

ROP is a polymerization technique that is well known to those skilled in the art. Generally, both metal and metal-free catalysts may be used in ROP polymerizations. Generally, the various ring-opening polymerizations (ROPs) in FIGS. 1-3 may be performed in a suitable solvent such as toluene at 110° C. Alternatively, the various ROPs in FIGS. 1-3 may be performed in a melt state (e.g., no solvent) at 110-180° C. using melt polymerization. Melt polymerization techniques are well known in the art.

In FIGS. 1-3, the use of Sn(Oct)$_2$ as a catalyst in the various ROPs is exemplary. Numerous catalysts well known in PLA polymerization can be utilized in the various ROPs in FIGS. 1-3. Suitable catalysts include, but are not limited to, tin(II) 2-ethylhexanoate (Sn(Oct)$_2$) (also referred to as "stannous octoate" and "tin octoate"), dimethylaminopyridine (DAP), diazabicycloundecene (DBU), and the like.

ATRP is a polymerization technique that is well known to those skilled in the art. Generally, polymerization via ATRP is conducted under extremely low steady state concentration of active radicals, allowing propagation of the polymer chain to proceed with suppressed radical-radical coupling. For example, the monomer and initiator may be added to a solution containing a catalytic copper/ligand complex (i.e., an ATRP catalyst and a ligand). In FIGS. 1-3, the use of CuBr as an ATRP catalyst and PMDETA as a ligand is exemplary. Suitable ATRP catalysts include, but are not limited to, copper (I) complexes such as copper(I) bromide (CuBr) and, optionally, copper(II) complexes such as copper(II) dibromide (CuBr$_2$). Traditional ATRP can be done with added copper (II), but still must have some copper (I) added. Suitable ligands include, but are not limited to, bipyridines such as 4,4'-dinonyl-2,2'bipyridine (DNBP) and bi-, tri- and tetradentate amines such as N,N,N',N',N"-pentamethyldiethylenetriamine (PMDETA).

The catalytic copper/ligand complex may be deoxygenated using known techniques such as successive cycles of freeze-pump-thaw. One skilled in the art will appreciate, however, that other techniques for deoxygenating the mixture may be used in lieu of, or in addition to, successive cycles of freeze-pump-thaw.

The ratio of ATRP catalyst (e.g., CuBr) to initiator can vary, although suitable results are obtained with ratios of 2:1-1:2. The ratio of monomer to initiator may also vary, although ratios of about 1:10-1:200 (or more) provide suitable results. For poly(MMA-co-MMAP) copolymer embodiments, the ratio of [MMA monomer]:[MMAP monomer] may also vary, although ratios suitable results are obtained with ratios of 1:1-20:1.

The ATRP synthesis of the monomer is performed at an appropriate temperature, for example, 60-70° C. The appropriate temperature can vary, however, depending on a number of factors including, but not limited to, the identity of the monomer, the initiator, the ATRP catalyst, and the ligand, as well as the boiling point of the solvent, if any.

Generally, the ATRPs in FIGS. 1-3 may be performed is a suitable solvent such as toluene at 60-100° C. Alternatively, the ATRPs in FIGS. 1-3 may be performed in a melt state (e.g., no solvent) using melt polymerization. Melt polymerization techniques are well known in the art.

One skilled in the art will appreciate that many variations are possible within the scope of the present invention. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A flame retardant acrylic/polylactic acid (PLA) copolymer, comprising:
   a diblock copolymer containing a PLA block and a poly (MMA-co-MMAP) block, wherein MMA is methyl methacrylate and MMAP is a MMAP monomer represented by the following formula:

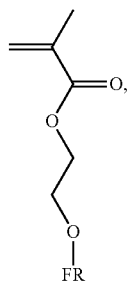

wherein FR is a phosphorus-containing moiety.

2. The flame retardant acrylic/PLA copolymer as recited in claim 1, wherein the diblock copolymer is represented by the following formula:

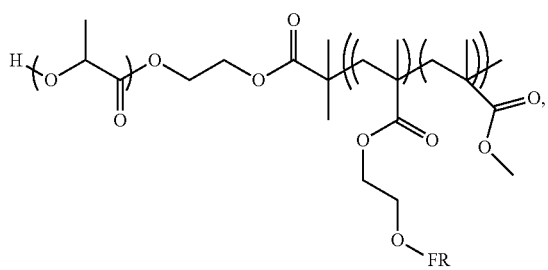

wherein FR is the phosphorus-containing moiety.

3. The flame retardant acrylic/PLA copolymer as recited in claim 1, wherein the diblock copolymer is represented by the following formula:

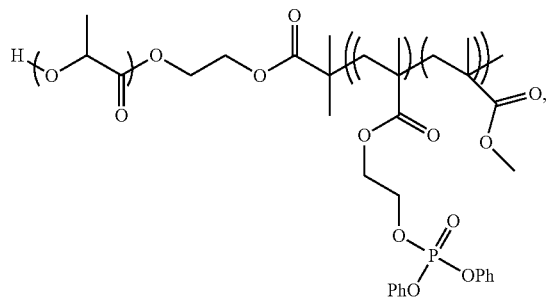

wherein Ph is a phenyl group.

4. A flame retardant acrylic/polylactic acid (PLA) copolymer, comprising:
   a diblock copolymer containing a PLA block and a poly (MMAP) block, wherein MMAP is a MMAP monomer represented by the following formula:

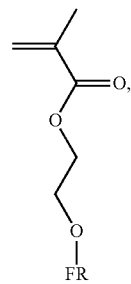

wherein FR is a phosphorus-containing moiety, wherein the diblock copolymer is synthesized by a method comprising the steps of:
   reacting 2-hydroxyethyl 2-bromoisobutyrate (HEBIB) and lactide in the presence of tin(II) 2-ethylhexanoate (Sn(Oct)$_2$) via ring-opening polymerization (ROP) to prepare a PLA-based polymer;
   reacting the PLA-based polymer and the MMAP monomer in the presence of CuBr and N,N,N',N',N''-pentamethyldiethylenetriamine (PMDETA) via atom transfer radical polymerization (ATRP) to prepare the diblock copolymer containing the PLA block and the poly(MMAP) block.

5. The flame retardant acrylic/PLA copolymer as recited in claim 2, wherein the diblock copolymer is synthesized by a method comprising the steps of:
   reacting 2-hydroxyethyl 2-bromoisobutyrate (HEBIB) and lactide in the presence of tin(II) 2-ethylhexanoate (Sn(Oct)$_2$) via ring-opening polymerization (ROP) to prepare a PLA-based polymer;
   reacting the PLA-based polymer, MMA and the MMAP monomer in the presence of CuBr and N,N,N',N',N''-pentamethyldiethylenetriamine (PMDETA) via atom transfer radical polymerization (ATRP) to prepare the diblock copolymer containing the PLA block and the poly(MMA-co-MMAP) block.

6. An article of manufacture comprising the flame retardant acrylic/PLA copolymer as recited in claim 1, wherein the flame retardant acrylic/PLA copolymer is blended with at least one of PLA and PMMA.

7. A flame retardant acrylic/polylactic acid (PLA) copolymer, comprising:
a triblock-graft copolymer containing PLA grafted outer blocks, linear PMMA outer blocks, and either a linear poly(MMAP) inner block or a linear poly(MMA-co-MMAP) inner block, wherein the linear PMMA outer blocks and either the linear poly(MMAP) inner block or the linear poly(MMA-co-MMAP) inner block define the backbone of the triblock-graft copolymer, wherein the PLA grafted outer blocks are grafted to the linear PMMA outer blocks, wherein MMA is methyl methacrylate and MMAP is a MMAP monomer represented by the following formula:

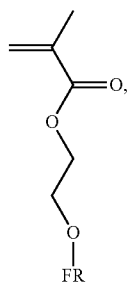

wherein FR is a phosphorus-containing moiety.

8. The flame retardant acrylic/PLA copolymer as recited in claim 7, wherein the triblock-graft copolymer contains the linear poly(MMAP) inner block, and wherein the triblock-graft copolymer is represented by the following formula:

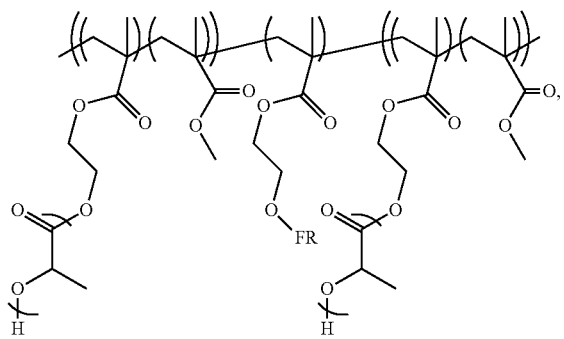

wherein FR is the phosphorus-containing moiety.

9. The flame retardant acrylic/PLA copolymer as recited in claim 7, wherein the triblock-graft copolymer contains the linear poly(MMA-co-MMAP) inner block, and wherein the triblock-graft copolymer is represented by the following formula:

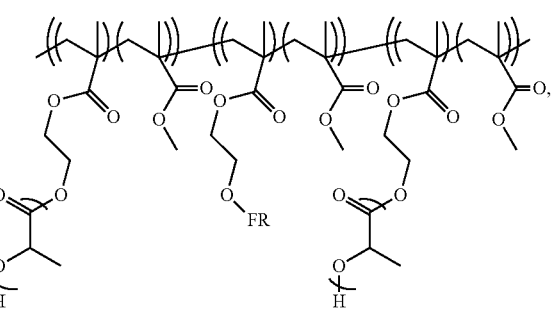

wherein FR is the phosphorus-containing moiety.

10. The flame retardant acrylic/PLA copolymer as recited in claim 7, wherein the triblock-graft copolymer contains the linear poly(MMA-co-MMAP) inner block, and wherein the triblock-graft copolymer is represented by the following formula:

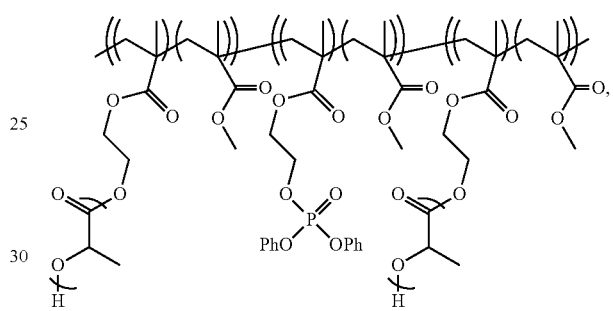

wherein Ph is a phenyl group.

11. The flame retardant acrylic/PLA copolymer as recited in claim 8, wherein the triblock-graft copolymer is synthesized by a method comprising the steps of:
reacting HEMA and MMA in the presence of methyl a-bromoisobutyrate, CuBr and N,N,N',N',N''-pentamethyldiethylenetriamine (PMDETA) via atom transfer radical polymerization (ATRP) to prepare a MMA-based copolymer;
reacting the MMA-based copolymer and the MMAP monomer in the presence of CuBr and PMDETA via ATRP to prepare a diblock copolymer containing a linear PMMA block and a linear poly(MMAP) block;
reacting the diblock copolymer, MMA and HEMA in the presence of CuBr and PMDETA via ATRP to prepare a triblock polymer containing the linear PMMA outer blocks and the linear poly(MMAP) inner block;
reacting the triblock copolymer and lactide in the presence of tin(II) 2-ethylhexanoate (Sn(Oct)$_2$) via ring-opening polymerization (ROP) to prepare the triblock-graft copolymer containing the PLA grafted outer blocks, the linear PMMA outer blocks, and the linear poly(MMAP) inner block.

12. The flame retardant acrylic/PLA copolymer as recited in claim 9, wherein the triblock-graft copolymer is synthesized by a method comprising the steps of:
reacting HEMA and MMA in the presence of methyl α-bromoisobutyrate, CuBr and N,N,N',N',N''-pentamethyldiethylenetriamine (PMDETA) via atom transfer radical polymerization (ATRP) to prepare a MMA-based copolymer;
reacting the MMA-based copolymer, MMA and the MMAP monomer in the presence of CuBr and PMDETA via ATRP to prepare a diblock copolymer containing a linear PMMA block and a linear poly(MMA-co-MMAP) block;

reacting the diblock copolymer, MMA and HEMA in the presence of CuBr and PMDETA via ATRP to prepare a triblock copolymer containing the linear PMMA outer blocks and the linear poly(MMA-co-MMAP) inner block;

reacting the triblock copolymer and lactide in the presence of tin(II) 2-ethylhexanoate (Sn(Oct)$_2$) via ring-opening polymerization (ROP) to prepare the triblock-graft copolymer containing the PLA grafted outer blocks, the linear PMMA outer blocks, and the linear poly(MMA-co-MMAP) inner block.

13. An article of manufacture comprising the flame retardant acrylic/PLA copolymer as recited in claim 7, wherein the flame retardant acrylic/PLA copolymer is blended with at least one of PLA and PMMA.

14. A flame retardant acrylic/polylactic acid (PLA) copolymer, comprising:
a triblock-graft copolymer containing PLA grafted outer blocks, a linear PMMA inner block, linear PMMA outer blocks, and either poly(MMAP) grafted inner blocks or poly(MMA-co-MMAP) grafted inner blocks, wherein the linear PMMA blocks define the backbone of the triblock-graft copolymer, and wherein the PLA grafted outer blocks are grafted to the linear PMMA outer blocks and either the poly(MMAP) grafted inner blocks or the poly(MMA-co-MMAP) grafted inner blocks are grafted to the linear PMMA inner block, wherein MMA is methyl methacrylate and MMAP is a MMAP monomer represented by the following formula:

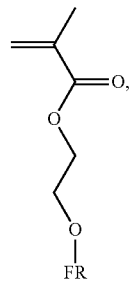

wherein FR is a phosphorus-containing moiety.

15. The flame retardant acrylic/PLA copolymer as recited in claim 14, wherein the triblock-graft copolymer contains the poly(MMAP) grafted inner blocks, and wherein the triblock-graft copolymer is represented by the following formula:

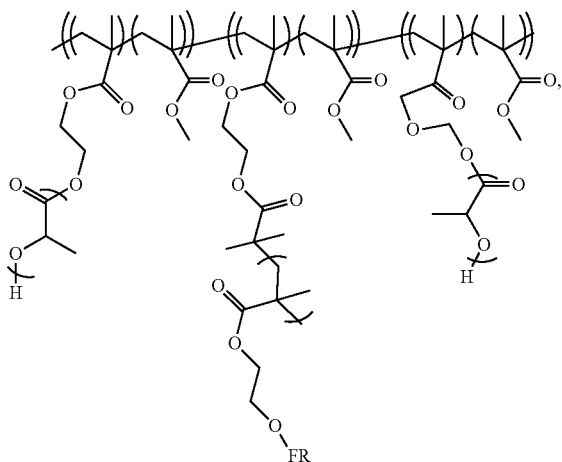

wherein FR is the phosphorus-containing moiety.

16. The flame retardant acrylic/PLA copolymer as recited in claim 14, wherein the triblock-graft copolymer contains the poly(MMA-co-MMAP) grafted inner blocks, and wherein the triblock-graft copolymer is represented by the following formula:

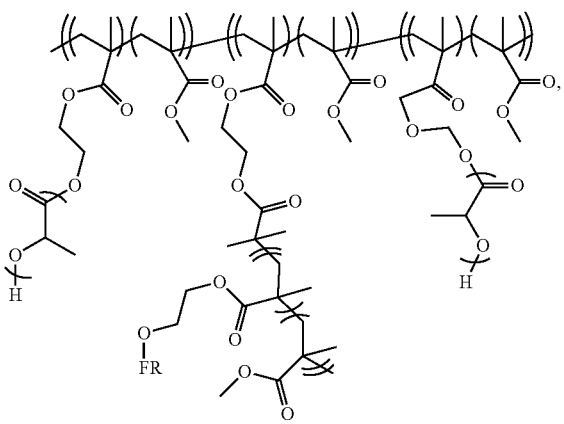

wherein FR is the phosphorus-containing moiety.

17. The flame retardant acrylic/PLA copolymer as recited in claim 14, wherein the triblock-graft copolymer contains the poly(MMAP) grafted inner blocks, and wherein the triblock-block copolymer is represented by the following formula:

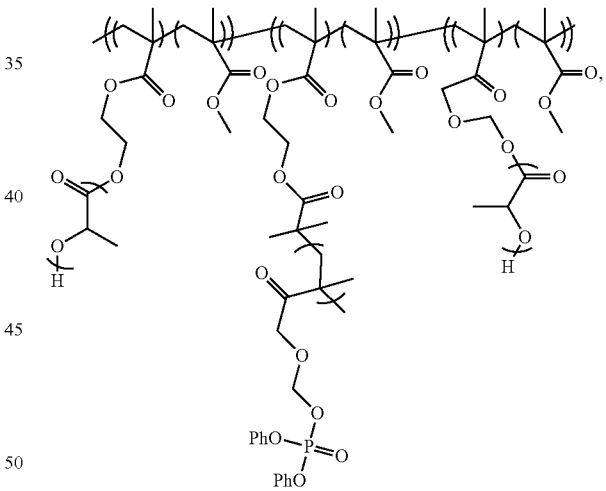

wherein Ph is a phenyl group.

18. The flame retardant acrylic/PLA copolymer as recited in claim 15, wherein the triblock-graft copolymer is synthesized by a method comprising the steps of:
reacting HEMA and MMA in the presence of methyl a-bromoisobutyrate, CuBr and N,N,N',N',N''-pentamethyldiethylenetriamine (PMDETA) via atom transfer radical polymerization (ATRP) to prepare a first MMA-based copolymer;
reacting the first MMA-based copolymer and aMMA in the presence of CuBr and PMDETA via ATRP to prepare a second MMA-based copolymer;
reacting the second MMA-based copolymer, MMA and HEMA in the presence of CuBr and PMDETA via ATRP to prepare a third MMA-based copolymer;

reacting the third MMA-based copolymer and the MMAP monomer in the presence of CuBr and PMDETA via ATRP to prepare a triblock copolymer containing the linear PMMA block and the poly(MMAP) grafted inner blocks;

reacting the triblock copolymer and lactide in the presence of tin(II) 2-ethylhexanoate $(Sn(Oct)_2)$ via ring-opening polymerization (ROP) to prepare the triblock-graft copolymer containing the PLA grafted outer blocks, the linear PMMA block, and the poly(MMAP) grafted inner blocks.

19. The flame retardant acrylic/PLA copolymer as recited in claim 16, wherein the triblock-graft copolymer is synthesized by a method comprising the steps of:

reacting HEMA and MMA in the presence of methyl a-bromoisobutyrate, CuBr and N,N,N',N',N"-pentamethyldiethylenetriamine (PMDETA) via atom transfer radical polymerization (ATRP) to prepare a first MMA-based copolymer;

reacting the first MMA-based copolymer and aMMA in the presence of CuBr and PMDETA via ATRP to prepare a second MMA-based copolymer;

reacting the second MMA-based copolymer, MMA and HEMA in the presence of CuBr and PMDETA via ATRP to prepare a third MMA-based copolymer;

reacting the third MMA-based copolymer, MMA and the MMAP monomer in the presence of CuBr and PMDETA via ATRP to prepare a triblock copolymer containing the linear PMMA block and the poly(MMA-co-MMAP) grafted inner blocks;

reacting the triblock copolymer and lactide in the presence of tin(II) 2-ethylhexanoate $(Sn(Oct)_2)$ via ring-opening polymerization (ROP) to prepare the triblock-graft copolymer containing the PLA grafted outer blocks, the linear PMMA block, and the poly(MMA-co-MMAP) grafted inner blocks.

20. An article of manufacture comprising the flame retardant acrylic/PLA copolymer as recited in claim 4, wherein the flame retardant acrylic/PLA copolymer is blended with at least one of PLA and PMMA.

* * * * *